United States Patent
Kinder et al.

(10) Patent No.: US 10,009,380 B2
(45) Date of Patent: Jun. 26, 2018

(54) SYSTEMS AND METHODS FOR SECURITY CONFIGURATION

(71) Applicant: SECUREWORKS HOLDING CORPORATION, Atlanta, GA (US)

(72) Inventors: Ross R. Kinder, Ann Arbor, MI (US);
Jon R. Ramsey, Atlanta, GA (US);
Timothy M. Vidas, Omaha, NE (US);
Robert Danford, Boulder, CO (US)

(73) Assignee: SECUREWORKS CORP., Wilmington, DE (US)

( * ) Notice: Subject to any disclaimer, the term of this patent is extended or adjusted under 35 U.S.C. 154(b) by 197 days.

(21) Appl. No.: 14/991,646

(22) Filed: Jan. 8, 2016

(65) Prior Publication Data

US 2017/0201548 A1   Jul. 13, 2017

(51) Int. Cl.
*G06F 17/00* (2006.01)
*H04L 29/06* (2006.01)
*H04L 12/24* (2006.01)
*H04L 12/26* (2006.01)

(52) U.S. Cl.
CPC .......... *H04L 63/20* (2013.01); *H04L 41/0813* (2013.01); *H04L 41/145* (2013.01); *H04L 41/147* (2013.01); *H04L 63/0227* (2013.01); *H04L 41/22* (2013.01); *H04L 43/16* (2013.01)

(58) Field of Classification Search
CPC .... H04L 63/20; H04L 63/0227; H04L 43/028
USPC .............................................................. 726/1
See application file for complete search history.

(56) References Cited

U.S. PATENT DOCUMENTS

| | | | |
|---|---|---|---|
| 7,299,292 B2 | 11/2007 | Morten et al. | |
| 7,386,525 B2 * | 6/2008 | Nurmela | H04L 63/0227 706/47 |
| 8,286,228 B2 | 10/2012 | Venters, III et al. | |
| 2003/0120622 A1 * | 6/2003 | Nurmela | H04L 63/0227 706/47 |
| 2008/0301757 A1 * | 12/2008 | Demarest | G06Q 10/10 726/1 |
| 2010/0180080 A1 | 7/2010 | Lin et al. | |
| 2014/0250501 A1 | 9/2014 | Berard et al. | |
| 2015/0074753 A1 * | 3/2015 | Esteve Balducci | H04L 63/20 726/1 |
| 2015/0358291 A1 * | 12/2015 | Halabi | H04L 63/0263 726/1 |
| 2015/0358358 A1 * | 12/2015 | Karhade | H04L 63/0227 726/1 |
| 2016/0191466 A1 * | 6/2016 | Pernicha | H04L 63/20 726/1 |

* cited by examiner

*Primary Examiner* — Teshome Hailu
(74) *Attorney, Agent, or Firm* — Larson Newman, LLP

(57) ABSTRACT

A method of configuring a network security device includes receiving a changed set of network rules to replace a current set of network rules; using a plurality of network traffic events to perform a first simulation of according to the current set of network rules and a second simulation according to the changed set of network rules; comparing the results of the first and second simulation to identify changes in network traffic allowed and denied between the current set and the changed set of network rules; displaying the changes in allowed and denied traffic for review of the changed set of network rules; receiving an instruction to implement the changed set of network rules based on the review; and filtering network traffic according to the changed set of network rules.

20 Claims, 3 Drawing Sheets

SYSTEMS AND METHODS FOR SECURITY CONFIGURATION

FIELD OF THE DISCLOSURE

The present disclosure generally relates to information handling systems, and more particularly relates to log-sensitive security configuration.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
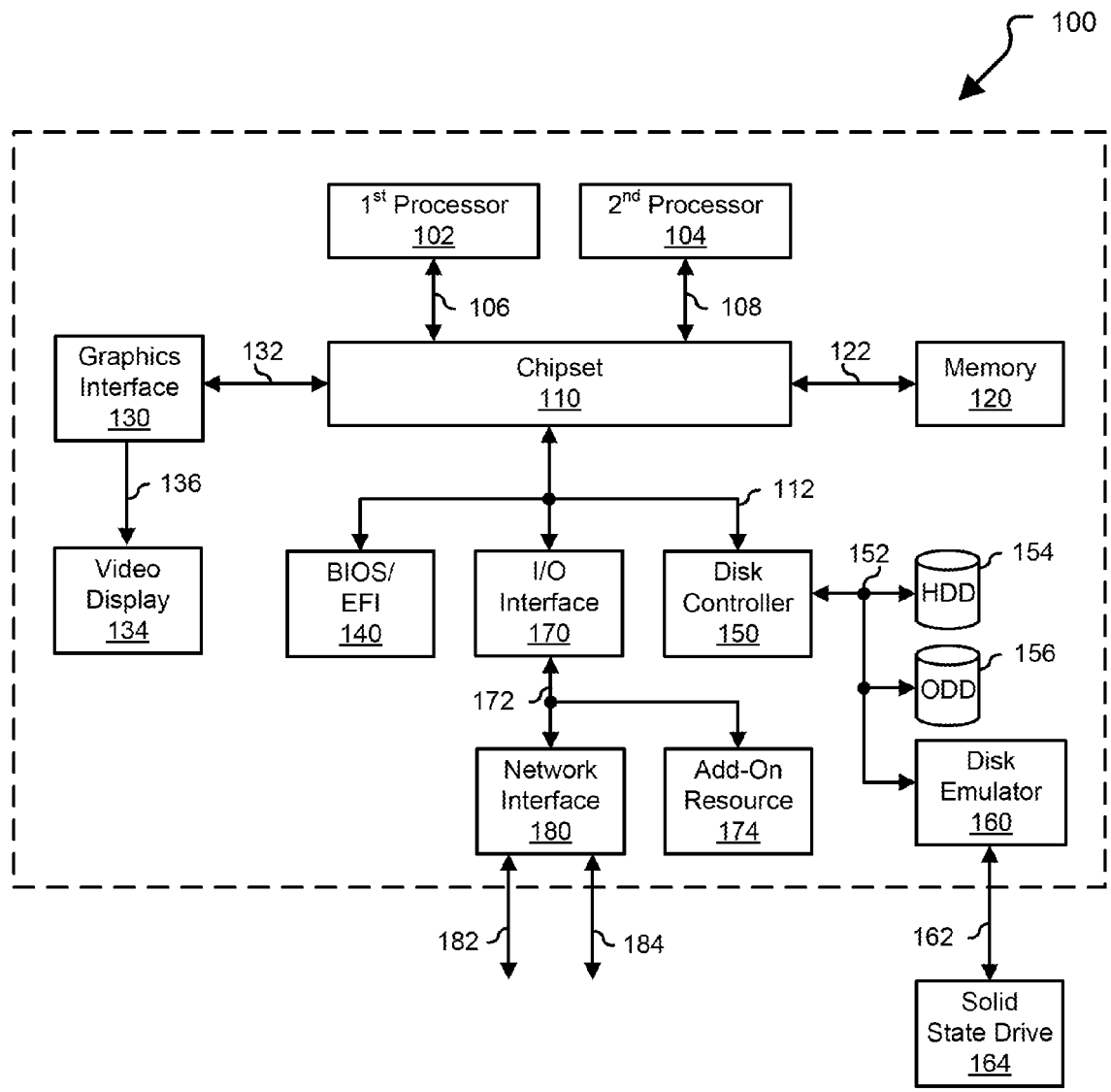
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

In various embodiments, filtering network traffic can reduce the chances of a network intrusion and can generally enhance security of devices behind the network filter or firewall. However, configuring network filtering rules can be challenging. Often, the network administrator has limited knowledge about applications that use the network and the types of traffic and network destinations they will typically utilize. Unfortunately, setting the network filters too stringently can prevent applications behind the network filter from communicating with other network devices and can prevent the proper function of the application. Additionally, operating procedures for approving and changing network filter rules may require hours to days of lead-time. As such, network administrators may tend towards more open rules, which can decrease overall network security. Streamlining the process for evaluation of network filter rules can limit downtime due to misconfigured rules and can reduce the lead-time for rule changes.

Figure 2:
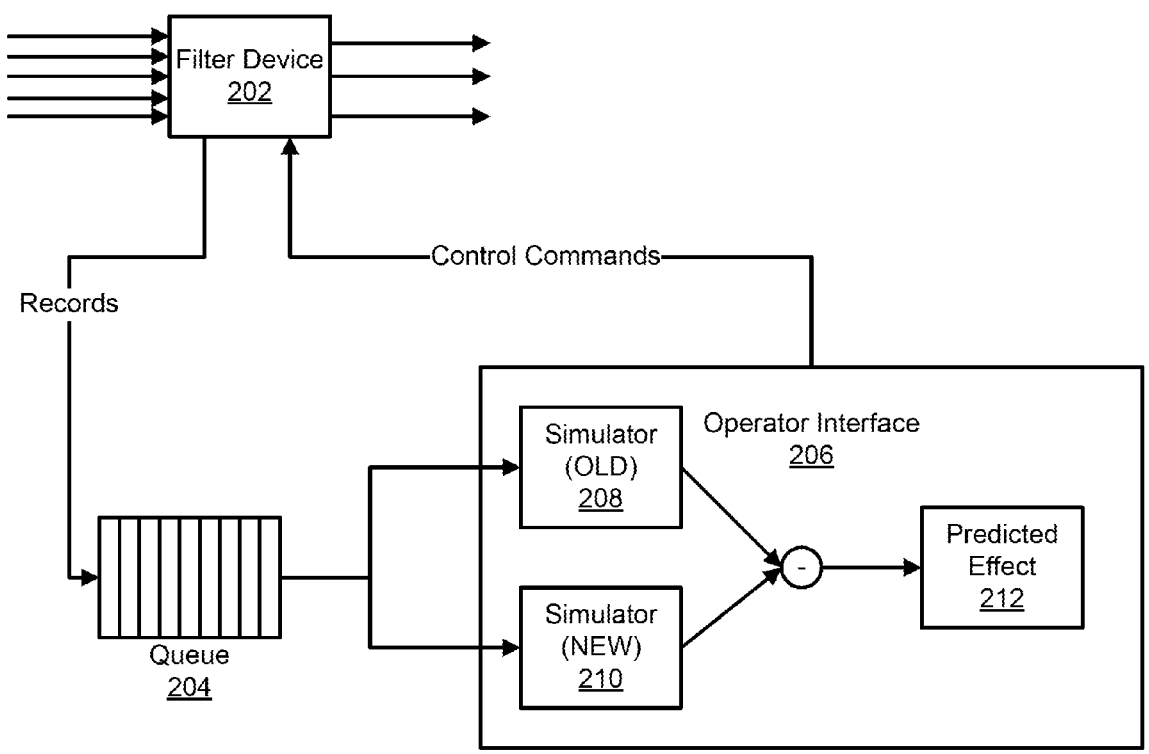
FIG. 2 is a block diagram illustrating a system for configuring network rules, in accordance with various embodiments.

FIG. 2 is a block diagram illustrating an exemplary system 200 for evaluating and configuring network filtering rules. Network filtering device 202 can record details of the traffic that is processed into a queue 204, such as a first-in-first-out (FIFO) queue. Queue 204 can store a number of network events and, once full, the oldest network events can be deleted from the queue 204 as new network events are recorded.

System 200 can provide an operator interface 206 for use when configuring network filter rules. When an operator, such as a network administrator, adds, deletes, or changes a rule through the operator interface 206, system 200 can use simulator 208 and 210 to simulate the old rule and the new rule on the events recorded in queue 204. The simulators 208 and 210 can identify which network events from queue 204 would be accepted and which events would be rejected based on old rule and new rule respectively.

The results of the simulations can be compared to provide a predicted effect 212. The predicted effect 212 can indicate which network traffic that was rejected by the old rule would be accepted by the new rule and which network traffic that was accepted by the old rule would be rejected by the new rule. These results can be provided to the operator to review before implementing the new rule on the network filter 202. In various embodiments, an operator can refine the rules through the operator interface 206 with feedback of the predicted effect 212 to identify rules that are too broad or too narrow or that will inadvertently allow desirable traffic or deny unwanted traffic.

Figure 3:
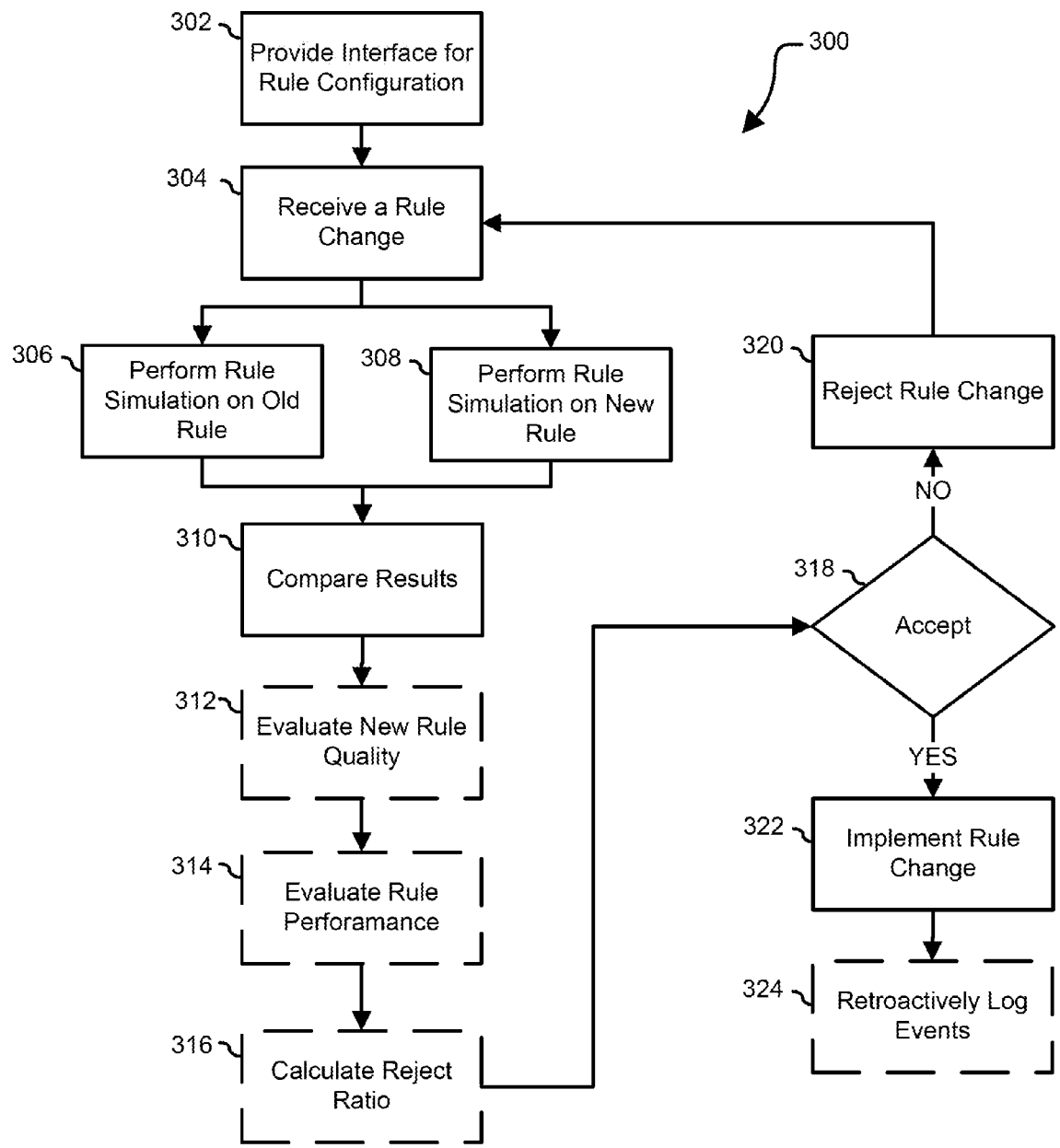
FIG. 3 is a state diagram illustrating the operation of an exemplary sensor within a network of autonomous sensors.

FIG. 3 is a flow diagram illustrating an exemplary method 300 of evaluating and configuring rule changes. At 302, a system can provide an interface for rule configuration. In various embodiments, the interface can be a graphical user interface (GUI) or an application programming interface (API). When implemented as a GUI, the interface can be used by an authorized user, such as a network administrator, to add, delete, or modify network filtering rules. When implemented as an API, a software program can use the interface to modify the network filtering rules in an automated fashion, such as in response to detecting a vulnerability or an attempted intrusion.

At 304, the interface can receive a rule, either from a human operator or from a software program. At 306, the system can perform a simulation of stored network events using the old rules, and, at 308, the system can perform a simulation of stored network events using the new rules. The stored network events can be stored in a queue, such as a FIFO queue, so that there is a set of current network event data for rule simulation.

At 310, the system can compare the results of the simulation. In various embodiments, the system can identify network events that were rejected by the old rules but accepted by the new rules and/or network events that were accepted by the old rules but rejected by the new rules. Additionally, it may be desirable to identify which rule was used to accept/reject the network events under the old rules and new rules, and changes thereto. This may identify a rule change that triggers an accept/reject by a modification to a higher priority rule that would have otherwise have been accepted/rejected by a lower priority rule which may be useful in debugging a rule set.

Optionally, at 312, the system can evaluate a quality of the new rule. In various embodiments, the quality can be evaluated by comparing string differences or estimated entropy of matches to wildcards within a rule. In some embodiments, a rule that produces small differences or low entropy matches to wildcards may be too broad. When the application for which the rule is intended has a narrower set of wildcard matches than the rule allows, there is the potential for unwanted traffic to match the rule. Ideally, the rule should allow the traffic needed for the intended application without allowing additional matches.

Optionally, at 314, the system can evaluate rule performance. In various embodiments, the system can compare CPU utilization, memory utilization, or other performance metrics between the simulation on the old rule and the simulation on the new rule. Rule changes that significantly decrease rule performance, such as increasing CPU or memory utilization, can negatively impact performance of the network filtering device and can be identified to the operator or can be rejected.

Optionally, at 316, the system can calculate a reject ratio. The reject ratio can be the ratio of the number of events rejected during the simulation on the old rule to the number of events rejected during the simulation of the new rule. The reject ratio can identify rule changes that significantly increase the amount of allowed traffic. Such rule changes may be the result of an inadvertent change that allows unwanted traffic through the network filter. As such, rule changes that result in a reject ratio that crosses a threshold can be flagged for operator review or can be blocked from automatic implementation.

At 318, a decision can be made to accept the rule changes. In various embodiments, the decision can be based on a response from an operator, or can be made in an automated fashion if the rule change passes the various applied metrics. At 320, when the decision is made not to accept the rule change, the rule change can be rejected. For example, if the new rule quality crosses a threshold, the rule performance crosses a threshold, or the reject ratio crosses a threshold, the system may block the implementation of the rule. In various embodiments, an operator can review the rule change and submit additional changes for evaluation at 304.

Alternatively, at 322, when the rule is accepted, such as when the rule passes all the require tests or when an operator reviews the simulation results and determine the rule has the intended effect, the rule can be implemented. Optionally, at 324, the logs can be updated to reflect the changes in the rule, such as by logging the accept/reject decisions from the simulation on the new rule.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A network security device comprising:
    a memory configured to:
        store a plurality of network events; and
        store a set of network filter rules;
    a processor configured to:
        provide an interface for modifying the set of network rules;
        receive a change to a set of network rules;
        perform a first simulation of network traffic allowed and denied according to the current set of network rules and a second simulation of network traffic allowed and denied according to the changed set of network rules using at least a portion of the network events;
        compare the results of the first and second simulation to identify changes in network traffic allowed and denied between the current set and the changed set of network rules;
        calculate an entropy of strings matching a wildcard of a new network rule of the chanced set of network rules;
        display the changes in allowed and denied traffic for review of the changed set of network rules and the entropy of the new network rule;
        receive an instruction to implement the changed set of network rules based on the review; and
        filter network traffic according to the changed set of network rules.

2. The network security device of claim 1, wherein the network events are stored in a first-in-first out buffer.

3. The network security device of claim 1, wherein the processor is further configured to group and display the plurality of network events.

4. The network security device of claim 1, wherein the processor is further configured to evaluate the use of computational resources during the first and second simulation.

5. The network security device of claim 1, wherein the processor is further configured to display a performance impact of the changed set of network rules.

6. The network security device of claim 1, wherein the processor is further configured to:
    evaluate the use of computational resources during the first and second simulation; and
    display a performance impact of the changed set of network rules or rejecting the changed set of rules if the performance impact crosses a threshold.

7. The network security device of claim 1, wherein the processor is further configured to:
    calculate a ratio of allowed traffic between the current set of network rules and the changed set of network rules; and
    reject the changed set of network rules if the ratio crosses a threshold.

8. The network security device of claim 1, wherein the processor is further configured to log a set of alerts generated by the changed set of network rules but not by the current set of network rules.

9. The network security device of claim 1, wherein the processor is further configured to:
    calculate a rule quality score for the changed set of network rules; and
    display the rule quality score or reject the changed set of rules if the rule quality score crosses a threshold.

10. A method for network security configuration, comprising:
    receiving a changed set of network rules to replace a current set of network rules;
    using a plurality of network traffic events to perform a first simulation of network traffic allowed and denied according to the current set of network rules and a second simulation of network traffic allowed and denied according to the changed set of network rules;
    comparing the results of the first and second simulation to identify changes in network traffic allowed and denied between the current set and the changed set of network rules;
    calculating the entropy of string matching a wildcard of a new network rule of the changed set of network rules;
    displaying the changes in allowed and denied traffic for review of the changed set of network rules;
    receiving an instruction to implement the changed set of network rules based on the review; and
    filtering network traffic according to the changed set of network rules.

11. The method of claim 10, wherein the network events are stored in a first-in-first-out buffer.

12. The method of claim 10, further comprising:
    evaluating the use of computational resources during the first and second simulation; and
    displaying a performance impact of the changed set of network rules or rejecting the changed set of rules if the performance impact crosses a threshold.

13. The method of claim 10, further comprising calculating a ratio of allowed traffic between the current set of network rules and the changed set of network rules, and reject the changed set of network rules if the ratio crosses a threshold.

14. The method of claim 10, further comprising logging a set of alerts generated by the changed set of network rules but not by the current set of network rules.

15. The method of claim 10, further comprising:
    calculating a rule quality score for the changed set of network rules; and
    displaying the rule quality score or rejecting the changed set of rules if the rule quality score crosses a threshold.

16. A method for network security configuration, comprising:
    retrieving a plurality of network events;
    grouping and displaying the plurality of network events;
    receiving a changed network rule;

simulating the effect of the changed network rule on the plurality of network events;

calculating an entropy of strings matching a wildcard of the changed network rule;

using a processor to evaluate the changed network rule based on a plurality of conditions including rejecting a rule quality score crossing a threshold a ratio of allowed traffic crosses a threshold, and a performance impact cross a threshold and to reject the changed network rule if at least one of the conditions is met; the rule quality based at least in part on the calculated entropy; and filtering network traffic according to the changed network rule if the changed network rule is not rejected.

17. The method of claim 16, wherein the plurality of network events are stored in a first-in-first-out buffer.

18. The method of claim 16, further comprising evaluating the performance impact by comparing a processor usage of a current network rule and the changed network rule.

19. The method of claim 16, further comprising evaluating the performance impact by comparing a memory usage of a current network rule and the changed network rule.

20. The method of claim 16, further comprising calculating a ratio of allowed traffic between a current network rule and the changed network rule.

* * * * *